May 27, 1941. V. E. VERRALL Re. 21,813
ELECTRORESPONSIVE DEVICE
Original Filed March 24, 1936 2 Sheets-Sheet 1
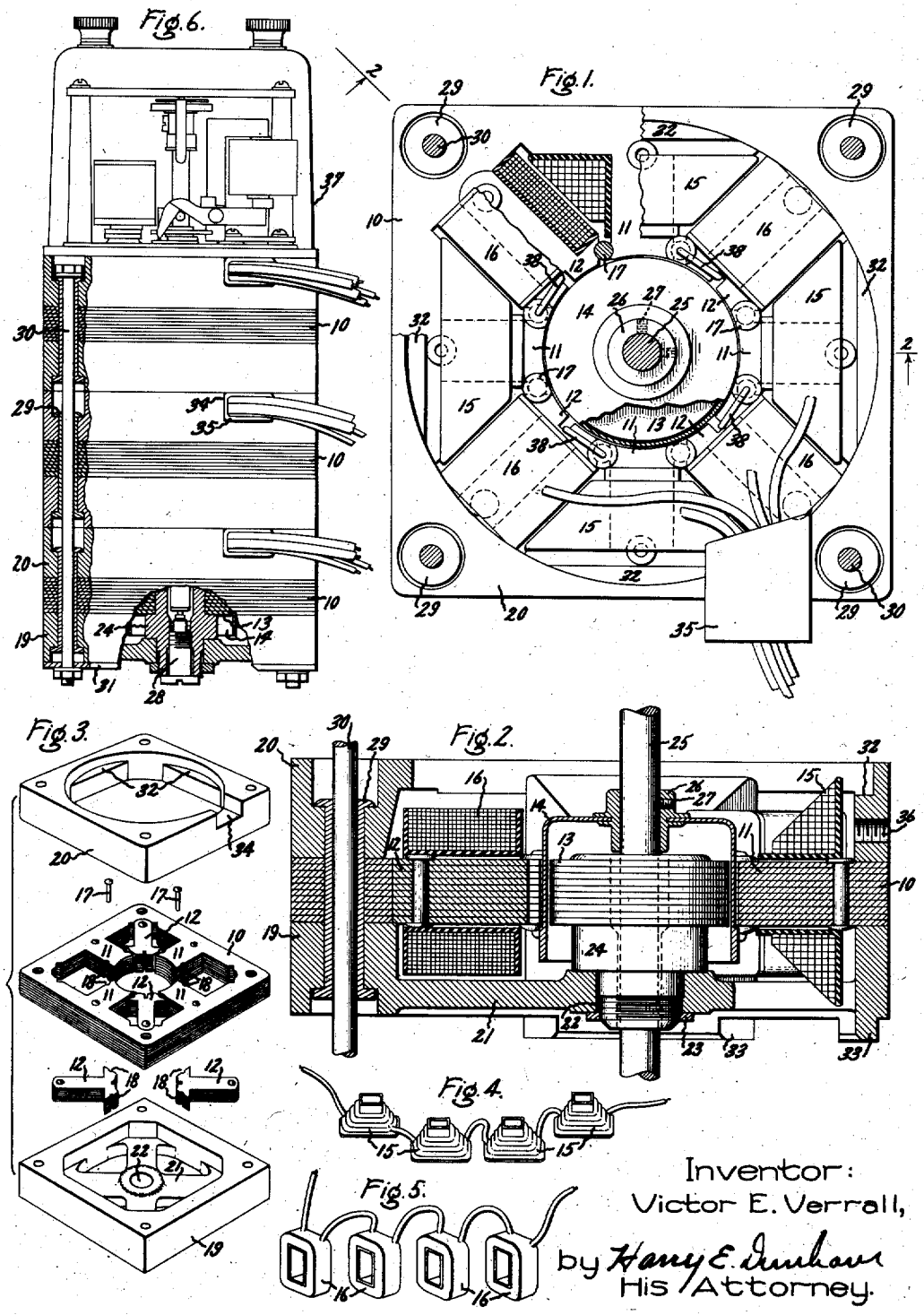
Inventor:
Victor E. Verrall,
by Harry E. Dunham
His Attorney.

ELECTRORESPONSIVE DEVICE
Original Filed March 24, 1936 2 Sheets-Sheet 2
Fig. 7.
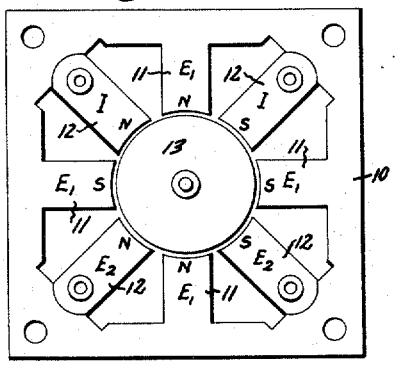
Fig. 8.
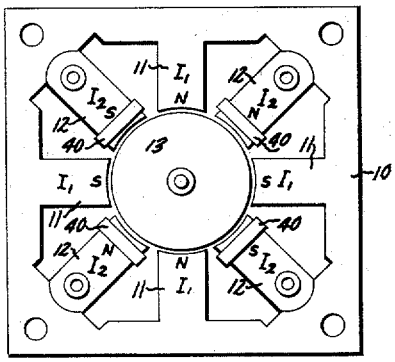
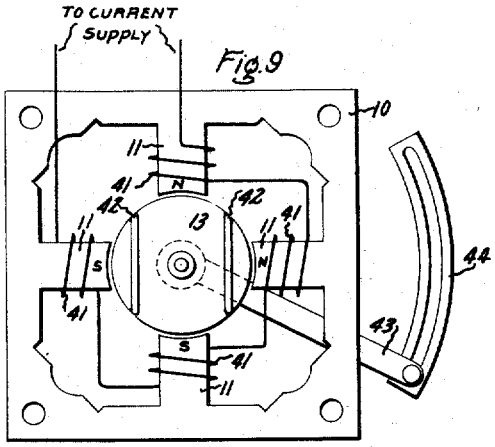
Fig. 10.
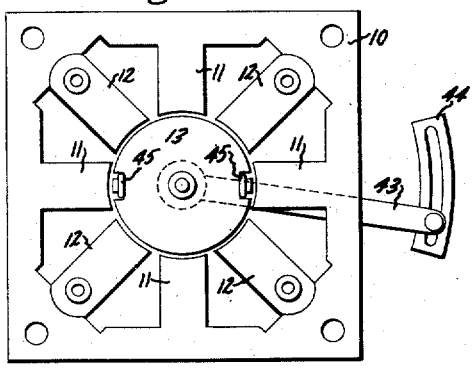
Fig. 11.
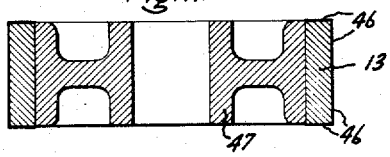
Fig. 12.
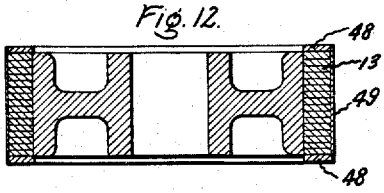
Inventor:
Victor E. Verrall,
by Harry E. Dunham
His Attorney.

Reissued May 27, 1941

Re. 21,813

UNITED STATES PATENT OFFICE 21,813

ELECTRORESPONSIVE DEVICE

Victor E. Verrall, Upper Providence Township, Delaware County, Pa., assignor to General Electric Company, a corporation of New York Original No. 2,110,686, dated March 8, 1938, Serial No. 70,580, March 24, 1936. Application for reissue March 1, 1939, Serial No. 259,263

30 Claims. (Cl. 175—294)

My invention relates to improvements in electroresponsive devices and more particularly to protective relays and, in general, the object of my invention is to provide an electroresponsive device which is an improvement over devices heretofore known to the art.

The rapid growth and the extensive interconnection of electric systems have raised protective requirements beyond the speed and sensitivity possibilities of induction disk relays. The maximum torque of such relays is usually limited to a certain phase-angle between the circuits energizing the relay. That this phase-angle or even a close approximation to it will exist during faulty conditions is uncertain. The torque obtainable in such relays for a given input is limited by inherent factors of design, such as high air-gap reluctance and large flux leakage. The input under certain fault conditions to which the relay must respond may be a fraction of the rated input, or of the input under other fault conditions further limiting the available torque and reducing the speed of response. Moreover, because of the relatively large disk, only a small portion of which is in use electrically at any instant, the resultant disk inertia and friction load delays movement in response to the torque actually developed. While there may be relays having relatively high speed and sensitivity for specific applications, their construction does not conveniently or economically lend itself to multiple unit relays or the desired diversity in relay application whereby a given construction can readily be modified to provide different kinds of protection for example, over-current, power-directional, distance, etc. For some applications, it is desirable that the movable member of the relay have a practically unlimited movement or that the developed torque be independent of movement. The induction disk relay has the advantage of unlimited movement, but plunger and pivoted magnetic armature type relays and ring type induction dynamometer relays do not have either the unlimited movement or the torque independent of movement features.

An object of my invention is to provide a high speed and high sensitivity electroresponsive device whose speed and sensitivity factors are several times those of the induction disk relay and whose movable member may have an unlimited movement and is substantially free of end play and chatter, and in which torque may be made independent of movement. Another object of my invention is to provide an improved electroresponsive device in which the materials of construction and space, including switchboard space requirements, are utilized to the best advantage, and which may be readily modified, for example, to provide different fault responsive devices having a wide range of protective applications. A further object of my invention is to provide an improved electroresponsive device unit, particularly for multiple unit relays, which insures simplicity and accuracy of assembly with consequent reduction in manufacturing costs, which requires no enclosing case, and which has a high rate of heat displacement. These and other objects of my invention will appear in more detail hereinafter.

My invention will be better understood from the following description when considered in connection with the accompanying two sheets of drawings, and its scope will be pointed out in the appended claims.

In the accompanying drawings, Fig. 1 is a top plan view, partly broken away and partly in section, of an electroresponsive device embodying my invention; Fig. 2 is a part sectional view on the line 2—2 of Fig. 1; Fig. 3 is an exploded view illustrating in perspective parts of the device shown in Figs. 1 and 2; Figs. 4 and 5 illustrate two groups of series connected form-wound energizing coils for the device shown in Figs. 1 and 2; Fig. 6 illustrates a multiple unit relay assembly embodying electroresponsive devices of the type shown in Figs. 1 and 2; Figs. 7 and 8 are diagrammatic outlines of the magnetic structure of the device shown in Figs. 1 and 2 to illustrate modifications of the device for different protective applications; Fig. 9 is another diagrammatic outline of the magnetic structure of Figs. 1 and 2 illustrating another modification for a different application and also a form of torque varying means; Fig. 10 illustrates the magnetic structure with a modification of the torque varying means shown in Fig. 9; and Figs. 11 and 12 illustrate modifications of the moving part of the devices shown in Figs. 1 and 2.

In the embodiment of my invention illustrated in Figs. 1 and 2 by way of example, I provide a relay torque producing or motor element which comprises a hollow magnetic stator 10 having a plurality of inwardly projecting salients comprising interspaced control and local poles 11 and 12, respectively, a magnetic member 13 centrally positioned relatively to and spaced from the inner ends or faces of the salients, a rotor 14 of electric current conducting material between the magnetic member 13 and the ends of the salients, and energizing windings 15 and 16 respectively disposed over the salients 11 and 12 so shaped as substantially to fill the spaces between the salients. While I have illustrated an eight salient device, it will be obvious from what follows that my invention is not limited to this particular number although it does provide the maximum torque for the available space consistent with low cost and diversity of application.

In order to have economy of switchboard space, I preferably arrange my device so that its vertical cross-section is rectangular. For economy of material and maximum coil space so as to obtain a high ratio of copper to iron, which is particularly important in relays having potential windings, I preferably make the stator 10 of laminations in the form of a hollow square. This provides the maximum usable core window area; and hence coil volume per unit of thickness for a given space occupied by the relay. Also for economy of construction and assembly and the greater safety in coil life, resulting from the use of form-wound coils since in random-wound coils a turn may readily slip and establish an unsafe potential difference between adjacent turns, I so construct the stator that alternate salients, such as 11, extending inwardly from the sides of the stator are integral therewith while the salients 12 also preferably laminated may be insertable in suitable recesses in the stator, as appears more clearly in Fig. 3. For alternate salients, for example, the integral salients 11, form-wound coils 15 of a generally pyramidal shape, as shown in Fig. 4, may be used, while for the other salients 12, form-wound coils 16 of a generally parallelepipedal shape may be used in order substantially completely to fill the space between the salients. Thus, the coils 15 may be slipped on the salients 11 and the coils 16 on the detached salients 12, which are then set in the stator recesses and secured by any suitable means, such as pins 17 driven into holes formed by opposed recesses 18 in the salients at adjacent corners thereof. Each group of interconnected coils 15 and 16 is therefore distributed over the poles 15 and 16 respectively to form a distributed winding. It will be obvious to those skilled in the art that the pyramidal coils may be placed on the diagonal salients and the parallelepipedal coils on the side salients but the space economy would not be so good unless the stator is otherwise than square.

In order to have a self-supporting unit assembly for the parts just described without any necessity for a case or housing and with the required heat dissipating properties for such a compact iron and copper assembly, I provide suitable end frames 19 and 20. While these may be of any suitable material, aluminum or an aluminum alloy may be used where high heat conductivity is desired. Such materials of course provide higher heat conductivity than the stator 10 and the windings 15 and 16. The bottom frame 19 includes suitable supporting means for the central magnetic member 13. As shown, this supporting means is a spider 21 in a central hole 22 of which is set and secured by suitable means, such as a nut 23, a hub 24 of nonmagnetic material on which the central magnetic member 13 is mounted. The hub 24 has a central hole for a shaft 25 to which the rotor hub 26 is secured by suitable means, such as a set screw 27. The lower end of the hub 24 may be threaded interiorly to receive a jewelled step bearing 28 for the shaft 25, as shown in Fig. 6.

For assembly purposes, the corners of the end frames 19 and 20 and the stator 10 may have registering holes to receive hollow rivets 29 through which bolts 30 may be passed to fasten two or more units together, as shown in Fig. 6. Where two or more units are thus secured together, a bottom-enclosing plate 31 may be provided.

In order to secure the necessary perfection of alinement and interchangeability of units, the upper face of the end frame 20 is cylindrically recessed, leaving shoulders 32. Into this recess there fit cylindrical projections 33 on the lower face of the end frame 19. It will be obvious that units may be thus simply assembled and yet insure the necessary precision in alinement and the desired interchangeability. It will be noted that the spaces between the arms of the spider 21 are filled by the windings 15 while the windings 16 fill in the spaces over the spider arms, thereby utilizing the space to the best advantages. Inasmuch as the edges of the laminations are exposed to the air and the coil spaces are exposed to the inner surface of the end frames, the necessary heat dissipation is secured. A notch 34 in the end frame 20 provides an opening through which the coil leads may be led, preferably in an insulating shell 35. Threaded holes 36 may be provided in the end frames for mounting the relay.

Since for mounting purposes it is desirable to make the cylindrical eddy-current rotor 14 and its closed end of one piece of metal so that it is in effect a cup, it is necessary, in order to avoid end play and vibration and the highly variable torques consequent on vibration, to so construct the rotor as to maintain conductivity balance about the central flux plane of the stator 10. While this could be done by lengthening the rotor, it would involve more space, increase inertia, and slow the action of the relay. In order to avoid entirely some of these undesirable features and minimize others, I thicken the rim of the rotor 14, as shown, but only to an extent that it will pass through the air gaps between the salients and the central magnetic member. I have found that for highest speed action, rotors of aluminum are preferable to copper because although the conductivity of aluminum is less than copper and therefore results in a torque reduction, this reduction is less than the gain resulting from the decrease in weight. In order to avoid biased torques and torques that vary with rotation, the rotor should have uniform conductivity throughout. When copper is used I have found that, since ordinary copper may contain oxide streaks of low conductivity, it is preferable to use oxygen-free high-conductivity copper.

The relay shown in Fig. 6 is polyphase power directional device embodying three of the units shown in Figs. 1 and 2 and a contact head and cover 37, which as it forms no part of my present invention other than to provide an upper bearing for the shaft 25, is unnecessary to describe here. For power directional action, the windings 15 are current windings and the windings 16 potential windings. As will be apparent to those skilled in the art, the windings 15 and 16 cooperate to produce a rotating or shifting magnetic field whose direction is dependent on the phase relation of the currents flowing in the windings. These windings may be connected to a polyphase circuit for power directional response in various ways, examples of which are well-known to the art. If it is desired to introduce a torque dependent upon only one of the electrical quantities involved, for example, a voltage restraint torque, as is often useful with power directional relays, flux retarding means such as shading windings 38 may be provided in the faces of the salients which are energized by the quantity in question. As will be apparent to those skilled in the art, the windings 16 and 38 produce a rotating or shifting magnetic field whose direction is dependent on the positioning of the windings 38 on the poles 12. Whether the torque due to the windings 16 and 38 opposes or assists the torque due to the windings 15 and 16 is dependent on the direction of this latter torque; that is, the direction of power flow.

Referring now to Fig. 7 and assuming that the salients 11 and 12 of the stator 10 are provided with energizing windings producing at any instant fluxes of the polarity indicated and connected to be energized with the current I and two voltages $E_1$ and $E_2$ of an alternating current circuit, then the torque $T_1$ on the rotor, not shown, will be $$T_1 = E_1 I \sin A - E_1 E_2 \sin B$$

A and B being phase displacement angles depending upon circuit constants of the relays. In other words, the torque consists of the particular directional current torque $E_1 I \sin A$ opposed by a voltage torque $E_1 E_2 \sin B$. Thus, there results a single phase power directional relay with voltage restraint.

Fig. 8 further illustrates the diversity of electroresponsive devices embodying my invention. If it be assumed that the salients 11 and 12 are provided with energizing windings producing at any instant fluxes of the polarities indicated and connected to be energized in accordance with two currents $I_1$ and $I_2$ derived from an alternating current circuit and that the diagonal salients 12 are provided with short-circuited windings or lag rings 40, then the torque $T_2$ on the rotor (not shown) will be $$T_2 = I_1 I_2 \sin (\theta + \phi)$$

$\theta$ being the phase angle lead of $I_1$ relatively to $I_2$ and $\phi$ the phase angle which the flux in salients 12 lags the current $I_2$ in the windings on these salients by reason of the lag rings 40. This arrangement provides a single phase directional ground relay.

The modification of my invention shown in Fig. 9 illustrates a simple over-current relay with a variable pick-up feature. In this case, it will be assumed that the energizing windings 41, which may be connected to a current transformer of an alternating current circuit, produce at any instant the polarities shown. Then the relay torque will be a function of the square of the current. In order to secure this torque and provide for varying the pick-up, I provide in recesses on the central magnetic member 13 short-circuited windings or rings 42 which, in the position shown, encircle the flux components in the horizontal salients 11 but not the flux components in the vertical salients 11. The central magnetic member 13 is secured to a movable arm 43 whereby the position of the member 13 can be changed so that the rings 42 encircle less and less of the flux in the horizontal salients and more and more in the vertical salients. In this way, the torque on the rotor, not shown, can be varied gradually to zero and its direction reversed if desired. Thus, if the arm 43 moves over a suitably graduated scale 44, this can be used to control the pick-up torque of the relay. The relative pitches of the shading ring and salient is a measure of the range of adjustment. Thus, in Fig. 9, the pitch is large but for a micrometer adjustment the pitch can be small, as shown in Fig. 10, in which the pitch of the ring 45 relatively to the salient is small.

Instead of having the central magnetic member 13 stationary, I may make it rotatable and combine with it the function of the electric current conducting rotor by applying to the exposed faces of the magnetic member 13, as indicated in Fig. 11, a copper coating 46 either by plating or spraying. For rotatable movement, the member 13 may be provided with a suitable nonmagnetic hub 47, as shown. Instead of plating the top and bottom faces, copper rings 48 may be used and the copper coating 49 applied to the cylindrical face of the member 13 electrically joining the two rings 48. The member 13 may be laminated. Constructions such as the modification shown in Figs. 11 and 12 provide higher torque than does the hollow cylindrical copper rotor because it is possible to work within practical limitations with smaller total air gaps between the salients and the central core 13, but because of the greater inertia of the rotating parts, the speed will not be as great as with the hollow cylindrical or cup rotor. While other well known rotor constructions such as the squirrel cage and hysteresis types may be used, their greater inertia reduces speed and sensitivity.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. An electroresponsive device comprising a magnetic stator in the form of a hollow square, said stator having a plurality of inwardly projecting salients, alternate salients being integral with the stator and the other salients insertable in the stator, a magnetic member centrally positioned relatively to and spaced from the inner ends of said salients, a rotor of electric current conducting material between said central magnetic member and the inner ends of said salients and form-wound coils for said salients so shaped as substantially to fill the spaces between the salients.

2. An electroresponsive device comprising a magnetic stator in the form of a hollow square, said stator having a plurality of inwardly projecting salients, alternate salients being integral with the stator and the other salients insertable in the stator, a magnetic member centrally positioned relatively to and spaced from the inner ends of said salients, a rotor of electric current conducting material rotatably mounted for movement in the gaps between said central magnetic member and the inner ends of the salients, and form-wound coils for said salients so shaped as substantially to fill the spaces between the salients.

3. An electroresponsive device comprising a magnetic stator in the form of a hollow square, an integral salient extending inwardly from each side of said stator, an inwardly extending diagonal salient insertable in each of the inner corners of said stator, a magnetic member centrally positioned relatively to and spaced from the inner ends of said salients, a rotor of electric current conducting material mounted for movement in the gaps between said central magnetic member and the inner ends of the salients, form-wound coils having a generally pyramidal shape for mounting on one of the groups of said salients, and form-wound coils having a generally parallelepipedal shape for mounting on the other group of salients.

4. An electroresponsive device comprising a magnetic stator in the form of a hollow square, an integral salient extending inwardly from the middle of each side of said stator, an inwardly extending diagonal salient insertable in each of the inner corners of said stator, a magnetic member centrally positioned relatively to and spaced from the inner ends of said salients, a rotor of electric current conducting material rotatably mounted for movement in the gaps between said central magnetic member and the inner ends of the salients, form-wound coils having a generally pyramidal shape for mounting on said integral salients, and form-wound coils having a generally parallelepipedal shape for mounting on said insertable salients.

5. An electroresponsive device comprising a magnetic stator in the form of a hollow square, said stator having a plurality of inwardly projecting salients, alternate salients being integral with the stator and the other salients insertable in the stator, means insertable between the adjacent corners of said salients for rigidly maintaining said insertable salients in place, a magnetic member centrally positioned relatively to and spaced from the inner ends of said salients, a rotor of electric current conducting material rotatably mounted for movement in the gaps between said central magnetic member and the inner ends of the salients, and form-wound coils for said salients so shaped as substantially to fill the spaces between the salients.

6. A relay motor unit comprising a hollow magnetic stator having a plurality of inwardly projecting salients, windings for energizing said salients, an end frame on each face of said stator, means for fastening together the end frames and stator of a unit, means for aligning a plurality of units including projections and openings on said end plates, a central magnetic member supported by one of said end frames and centrally positioned relatively to and spaced from the inner ends of said salients, and a rotatably mounted cylindrical member of electric current conducting material movable in the gaps between said central magnetic member and the inner ends of said salients.

7. A relay motor unit comprising a hollow magnetic stator having a plurality of inwardly projecting salients, coils for energizing said salients, an end frame on each face of said stator forming with the edges of said stator an enclosure for said coils, said frames being of a material of high heat conductivity, means for fastening together the end frames and the stator of a unit, a central magnetic member supported by one of said end frames and centrally positioned relatively to and spaced from the inner ends of said salients, and a rotor of electric current conducting material between said central magnetic member and the inner ends of said salients.

8. A relay motor unit comprising a hollow magnetic stator having a plurality of inwardly projecting salients, windings for energizing said salients, an end frame on each face of said stator, means for securing said end frames and stator together for the alinement and the fastening of a plurality of units, a central magnetic member supported by one of said end frames and centrally positioned relatively to and spaced from the inner ends of said salients, a shaft extending through said central magnetic member and one of said end frames, a rotor of electric current conducting material mounted on said shaft and movable in the gaps between said central magnetic member and the inner ends of said salients.

9. A relay motor unit comprising a hollow magnetic stator having a plurality of inwardly projecting salients, windings for energizing said salients, an end frame on each face of said stator, means for securing said end frames and stators together for the alinement of and the fastening together of a plurality of units, a central magnetic member, a support centrally positioning said member relatively to and spaced from the inner ends of said salients, a shaft extending through said central magnetic member and one of said end frames, a rotor of electric current conducting material mounted on said shaft and movable in the gaps between said central magnetic member and the inner ends of said salients and a bearing for said shaft mountable in said support.

10. An electroresponsive device comprising a hollow magnetic stator, a plurality of salients extending inwardly from said stator, a magnetic member centrally positioned relatively to and spaced from the inner ends of said salients, a cylindrical rotor of electric current conducting material of substantially uniform thickness mounted for movement in the gaps between said central magnetic member and the inner ends of the salients, one end of said rotor being substantially closed and the rim of the other end being materially thickened to maintain the current conductivity balance of the rotor, and energizing windings for said stator.

11. A relay motor unit comprising a hollow magnetic stator having a plurality of inwardly projecting salients, windings for energizing said salients, a magnetic member centrally positioned relatively to and spaced from the inner ends of said salients, a rotor of electric current conducing material rotatably mounted for movement in the gaps between said central magnetic member and the inner ends of the salients, and flux shading means including a short-circuited winding mounted on said central magnetic member.

12. A relay motor unit comprising a hollow magnetic stator having a plurality of inwardly projecting salients, windings for energizing said salients, a magnetic member centrally positioned relatively to and spaced from the inner ends of said salients, a rotor of electric current conducting material rotatably mounted for movement in the gaps between said central magnetic member and the inner ends of the salients, flux shading means including a short-circuited winding mounted on said central magnetic member, and means for turning said central magnetic member to vary the effect of said short-circuited winding.

13. A power directional electroresponsive device comprising a magnetic stator in the form of a hollow square, an integral salient extending inwardly from each side of said stator, an inwardly extending diagonal salient insertable in each of the inner corners of said stator, a form-wound current coil having a generally pyramidal shape for mounting on one of the groups of said salients, a form-wound potential coil having a generally parallelepipedal shape for mounting on the other group of said salients, a magnetic member centrally positioned relatively to and spaced from the inner ends of said salients, and a rotor of electric current conducting material between said member and the inner ends of the salients.

14. A power directional electroresponsive device comprising a magnetic stator in the form of a hollow square, an integral salient extending inwardly from each side of said stator, an inwardly extending diagonal salient insertable in each of the inner corners of said stator, a form-wound current coil having a generally pyramidal shape for mounting on said integral salients, a form-wound potential coil having a generally parallelepipedal shape for mounting on said diagonal salients, a magnetic member centrally positioned relatively to and spaced from the inner ends of said salients, a rotor of electric current conducting material between said member and the inner ends of said salients, and means for providing a torque on said rotor dependent only on the energization of the potential windings including short-circuited windings in the end faces of the diagonal salients.

15. A relay motor unit comprising a hollow magnetic stator having a plurality of inwardly projecting salients, coils for energizing said salients, an end frame on each face of said stator forming with the edges of said stator an enclosure for said coils, means for fastening together the end frames and the stator of a unit, a central magnetic member supported by one of said end frames and centrally positioned relatively to and spaced from the inner ends of said salients, and a rotor of electric current conducting material between said central magnetic member and the inner ends of said salients.

16. An electroresponsive device comprising a hollow magnetic stator, a plurality of salients extending inwardly from said stator, alternate salients being inserted in the stator, a magnetic member centrally positioned relatively to and spaced from the inner ends of said salients, a rotor of electric current conducting material mounted for movement in the gaps between said central magnetic member and the inner ends of the salients, form-wound coils having a generally pyramidal shape mounted on alternate salients, and form-wound coils having a generally parallelepipedal shape for mounting on the other salients.

17. A relay assembly comprising a plurality of relay units mounted one against the other, each of said units comprising a magnetic stator having a plurality of inwardly projecting salients, windings on said salients, an end frame for each face of said stator, means for fastening said end frames and stator together and a rotor of electric current conducting material, means for aligning said relay units including a projection on one end frame of a unit registerable with an opening on the adjacent end frame of the next unit, a shaft carrying the rotors of said units, means for supporting said shaft so as centrally to position said rotors relatively to the inner ends of said salients including a bearing in one of said end frames, and means for securing said units together.

18. A relay unit comprising a magnetic stator having a plurality of inwardly projecting salients, certain of said salients being integral with the stator and the other salients being insertable in the stator, a magnetic member centrally positioned relatively to the inner ends of said salients, coils for said salients so shaped as substantially to fill the spaces between the salients, and a short-circuited electric current conducting path centrally positioned relatively to the inner ends of said salients and adapted to rotate in response to the fluxes flowing between said salients and said central magnetic member when said coils are energized.

19. An electroresponsive device comprising a magnetic stator in the form of a hollow square, a salient extending inwardly from each side of said stator substantially perpendicular to said side, a salient extending diagonally inward from each corner of said stator, alternate salients of all of said salients being integral with said stator and the other salients being insertable in the stator, a magnetic member centrally positioned relatively to and spaced from the inner ends of said salients, a closed current conducting path rotatable in the gaps between said central magnetic member and the inner ends of said salients, and windings for energizing said salients.

20. In combination with a two-element alternating current relay having a distributed local constantly energized winding and a distributed control winding variably energized by current out of phase with the current in the local winding for producing a rotating magnetic field; means retarding a portion of the flux produced by the energization of the local winding so that the retarded flux reacts with the unretarded flux produced by the local winding to provide a shifting magnetic field shifting in the opposite direction to the rotating magnetic field; and a rotor inductively actuated in either direction according to the predominance of either the first or the second magnetic field.

21. In a relay, a magnetic stator having a plurality of spaced local poles and a plurality of control poles spaced between the local poles, a flux retarding conductor surrounding a portion of each of the local poles, a winding on the local poles for, in combination with said flux retarding conductors, producing a magnetic field shifting in one direction when energized from an alternating current source, a winding on the control poles for, in combination with the winding on said local poles, producing a magnetic field rotating in an opposite direction when energized by alternating current out of phase with the current in the winding on the local poles, and a rotor inductively actuated by said magnetic fields.

22. In an alternating current relay, a stator, a stationary magnetic core within the stator, flux retarding means in the stator, a constantly energized distributed winding on the stator associated with the flux retarding means for providing a magnetic field rotating shifting in one direction, a distributed control winding on the stator, means changing the phase relationship between current in the control winding and current in the constantly energized winding to provide a magnetic field rotating in the other direction, and an eddy-current induction rotor within the stator actuated by said magnetic fields.

23. In an alternating current relay, an eddy-current armature, electromagnetic means including a distributed first winding for operating the armature in one direction, and electromagnetic means including said first winding and a distributed second winding for operating the armature in the other direction.

24. In an alternating current relay, a local pole having a local coil thereon which is constantly energized, a control pole having a control coil thereon energizable by current out of phase with the current in the local coil and reacting with the local pole for producing a rotating field, means retarding a portion of the flux produced by current in the local coil so that the retarded flux reacts with the unretarded flux produced by the local coil to produce a magnetic field shifting in the opposite direction to the rotating magnetic field, and a rotor inductively actuated by either the first or the second magnetic field.

25. In an alternating current relay, a local pole having a local coil thereon which is constantly energized, a control pole having a control coil thereon energizable by current out of phase with the current in the local coil and reacting with the local pole for producing a rotating field, means retarding a portion of the flux produced by current in the local coil so that the retarded flux reacts with the unretarded flux produced by the local coil to produce a magnetic field shifting in the opposite direction to the rotating magnetic field, and a rotor inductively actuated in either direction according to the predominance of either the first or the second magnetic field.

26. In an alternating current relay, outer and inner stationary magnetic structures, an eddy-current rotor rotatable between the outer and inner magnetic structures, electromagnetic means including a distributed first winding on the outer magnetic structure for operating the rotor in one direction, and electromagnetic means including said first winding and a second distributed winding on the outer magnetic structure for operating the rotor in a reverse direction.

27. In an alternating current relay, outer and inner stationary magnetic structures and eddy-current rotor rotatable between the outer and inner magnetic structures, electromagnetic means including a distributed first winding on the magnetic structure for operating the rotor in one direction from a single phase source of alternating current energy, and electromagnetic means including said first winding and a distributed second winding on the outer magnetic structure for operating the rotor in a reverse direction from said source of alternating current energy.

28. In a relay, a magnetic stator having a first plurality of spaced poles and a second plurality of poles spaced between the poles of said first plurality of poles, a magnetizing winding on the poles of said first plurality of poles and a magnetizing winding on the poles of said second plurality of poles, said magnetizing windings when respectively energized by two alternating quantities displaced in phase cooperating to produce a magnetic field rotating in one direction, a shading winding for each of the poles of said first plurality of poles, said shading windings and the magnetizing winding on the poles provided with the shading windings cooperating to produce a magnetic field shifting in the opposite direction to said rotating magnetic field, and a rotor inductively actuated by said magnetic fields.

29. An alternating current relay comprising inner and outer magnetic stators, one of said stators being provided with a plurality of salients extending toward the other stator, an electric current conducting rotor mounted for movement between said stators, a magnetizing winding on alternate salients of said stator, a magnetizing winding on the other salients of said stator, said magnetizing windings when respectively energized by two alternating current quantities displaced in phase cooperating to tend to turn said rotor in one direction, a shading winding for each of said alternate poles, the magnetizing winding on said alternate poles and the shading winding thereon cooperating to tend to turn said rotor in the opposite direction.

30. In combination with a two-element alternating current relay having a first plurality of poles energized by a first winding and a second plurality of poles energized by a second winding energizable by current out of phase with the current in the first winding for producing a rotating magnetic field; means retarding a portion of the flux produced by the energization of the first winding so that the retarded flux reacts with the unretarded flux produced by the first winding to provide a magnetic field shifting in the opposite direction to the rotating magnetic field, and a rotor inductively actuated by said magnetic fields.

VICTOR E. VERRALL.